United States Patent [19]
Barnett

[11] 3,834,089
[45] Sept. 10, 1974

[54] MONOWHEEL PLASTIC LENS EDGER

[75] Inventor: Cecil Barnett, London, England

[73] Assignee: Raphael's Limited, London, England

[22] Filed: Feb. 12, 1973

[21] Appl. No.: 332,006

[30] Foreign Application Priority Data
Feb. 14, 1972 Great Britain.................. 68013/72

[52] U.S. Cl. ............................................... 51/284
[51] Int. Cl............................ B24b 1/00, B24b 9/14
[58] Field of Search ...................... 51/284, 101 LG

[56] References Cited
UNITED STATES PATENTS
3,520,091  7/1970  Raphael............................... 51/284
3,673,738  7/1972  Stern ......................... 51/101 LG X

*Primary Examiner*—Donald G. Kelly
*Attorney, Agent, or Firm*—Watson, Cole, Grindle & Watson

[57] ABSTRACT

An edging process performed on a lens made of transparent plastics material, comprising shaping the lens to the desired peripheral profile and also forming a V-section edge formation thereon by the use of a grooved milling or grinding wheel, in a single operation, the relative positions of the lens and the wheel being determined by an adjustable stop with which a surface of the lens is held in contact.

3 Claims, 3 Drawing Figures

MONOWHEEL PLASTIC LENS EDGER

This invention relates to the edging process in the manufacture of lenses, particularly spectacle lenses.

In addition to the optical shaping and finishing of the front and rear surfaces of a lens, it is necessary to perform an edging process on the edge of the lens, to shape it to the desired external profile, for example so that it can be fitted into a spectacle frame of a particular size and shape. Particularly in the case of spectacle lenses the edging process may also involve forming a V section rib or ridge around the periphery of the lens, to be received into a corresponding V-section groove in the frame.

The V-section rib or ridge is generally of one or other of two known shapes. One of these shapes is known as the V edge, the V having a peak angle of 120°–135° and the sides of the V being as long as is necessary to embrance the outside and inside edges of the lens, according to its thickness. The other known shape is also a V but it has a base width restricted, typically in spectacle lenses, to about 2.5mm, so that in the case of a lens edge thicker than about 2.5mm, there is a shoulder on each side of the V, the widths of the shoulders varying according to the thickness of the edge of the lens and to the extent to which the V is central or offset. A lens having an edge thickness no greater than the width of the base of the V, in the present case, about 2.5mm or less, will not have any such shoulder.

It is an object of the present invention to provide an improved edging process for the manufacture of lenses made of transparent plastics material such as allyl diglycol carbonate or polymethyl methacrylate.

Other and further objects will become apparent from the following description.

According to the present invention an edging process performed on a lens made of transparent plastics material comprises shaping the lens to the desired peripheral profile, and also forming a V-section edge formation thereon by the use of a grooved milling or grinding wheel, in a single operation, the relative positions of the lens and the wheel being determined by an adjustable stop with which a surface of the lens is held in contact.

It has been found that in the case of a plastic lens it is possible to perform the edging in a single operation, in contrast to the two separate operations hitherto considered to be necessary both for glass and plastic lenses.

It has hitherto been the universal practice in forming the edges of lenses, whether of glass of transparent plastics, to perform two cutting or grinding operations in succession. The first operation is a rapid, coarse, template-guided cutting or grinding operation, whereas the second is a relatively slow and fine finishing operation.

In the second operation of the conventional two stage edging process it has been found of value to use an adjustable stop, the lens being held with its front surface lightly in contact with the stop as the lens is revolved in a revolving mounting with its edge in contact with a rapidly rotating grinding wheel or milling cutter. This stop positions the peak of the V in relation to the front surface of the lens, the actual distance being under the control of the operator who can vary the adjustment of the stop.

The present invention results from the appreciation that, surprisingly, by the use of such a grooved grinding wheel in conjunction with the adjustable stop it is possible to obtain, with a lens of plastics material, the three desiderata of speed, quality of finish and positioning of the peak of the V in relation to the lens surface, in a single operation.

The design of the edge of the wheel and its surface speed are preferably so selected that only one rotation of the lens is required, to give a satisfactory quality of finish.

The lens may be held against the stop by means of a light biasing spring.

The invention may be performed in various ways, and one machine suitable for performing the process embodying the invention will now be described by way of example with reference to the accompanying drawings, in which FIG. 1 is a side view of the machine, partly in section;

Figure 1:
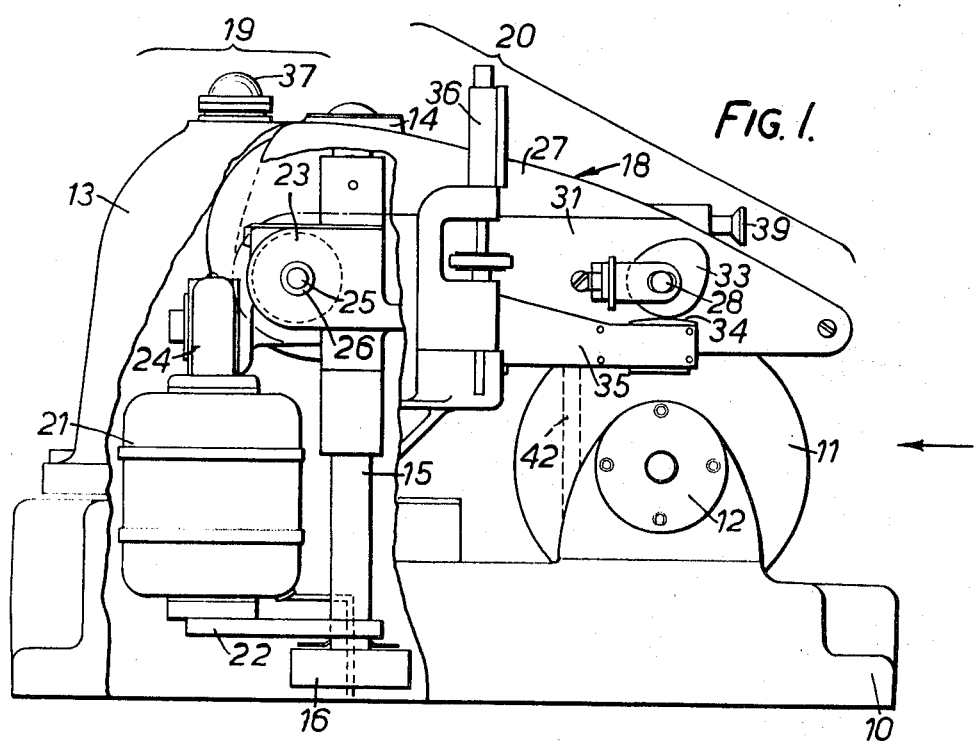

The machine shown in the drawings comprises a base plate 10 which carries a grinding wheel 11 supported in bearings 12 and provided with any suitable drive (not shown) for rotating the grinding wheel at high speed. The grinding wheel can be made of diamond impregnated metal, steel teeth or tungsten alloy teeth and operates at a surface speed of 3,000–5,000 feet per minute. The grinding wheel has a V-shaped groove in its periphery. Mounted on the rear of the base plate 10 there is a hollow pillar 13 which carries a bearing 14 for the upper end of a vertical pivot shaft 15. The bottom end of the pivot shaft 15 is supported in a bearing 16 in the base plate 10.

Mounted on the pivot shaft 15 so that it can swing horizontally is a carrier assembly 18. The carrier assembly comprises two main sections, namely an inner section 19 and an outer section 20.

The inner section 19 comprises a lens driving motor 21 supported on the pivot shaft 15 by an arm 22 and by a bracket 23. The motor 21 is arranged with its shaft vertical and drives, through double reduction worm gearing 24, a horizontal cross shaft 25 which is mounted for rotation in the bracket 23. The bracket 23 is provided with laterally projecting bosses 26 surrounding the cross shaft 25 which serve as horizontal pivots for the outer section 20 of the carrier assembly.

The outer section 20 includes a lens-carrying arm 27 the rear end of which is journalled on the bosses 26 and which carries near to its front end transverse horizontal carrier shafts 28 and 29 for the lens 30. The lens 30 is held between pads carried on the inner ends of the shafts 28 and 29. These shafts 28 and 29 are driven by motor 21 through the gearing 24 and the cross shaft 25 by means of belt or chain drives enclosed in casings 31 and 32, pulleys or sprockets being provided on the ends of the cross shaft 25 and similar pulleys or sprockets being provided on the shafts 28 and 29. The lens driving motor 21 and the gearing 24 are such that the lens 30 is rotated at a speed in the range from 2 to 10 revolutions per minute.

Detachably mounted on the end of the lens carrier shaft 28 is a guide template or cam 33 which rotates over an anvil or first stop 34 carried on an arm 35 which is rigid with the base plate 10. As the cam 33 rotates, the height of the outer section 20 of the carrier assembly is varied to suit the contour of the particular lens that is being ground and to provide the required peripheral shape.

The whole lens carrier assembly 18 is free to swing laterally about the vertical pivot shaft 15, to permit the lens to "float" freely in the groove of the grinding wheel, except in so far as this is restricted by contact between the convex face of the lens and a second stop 41 referred to below. Since the lens driving motor 21 forms part of the lens carrier assembly there is no residual torque reaction from the lens drive which would tend to apply a lateral force to the lens tending to press it against one or other of the sides of the groove of the grinding wheel.

Figure 2:
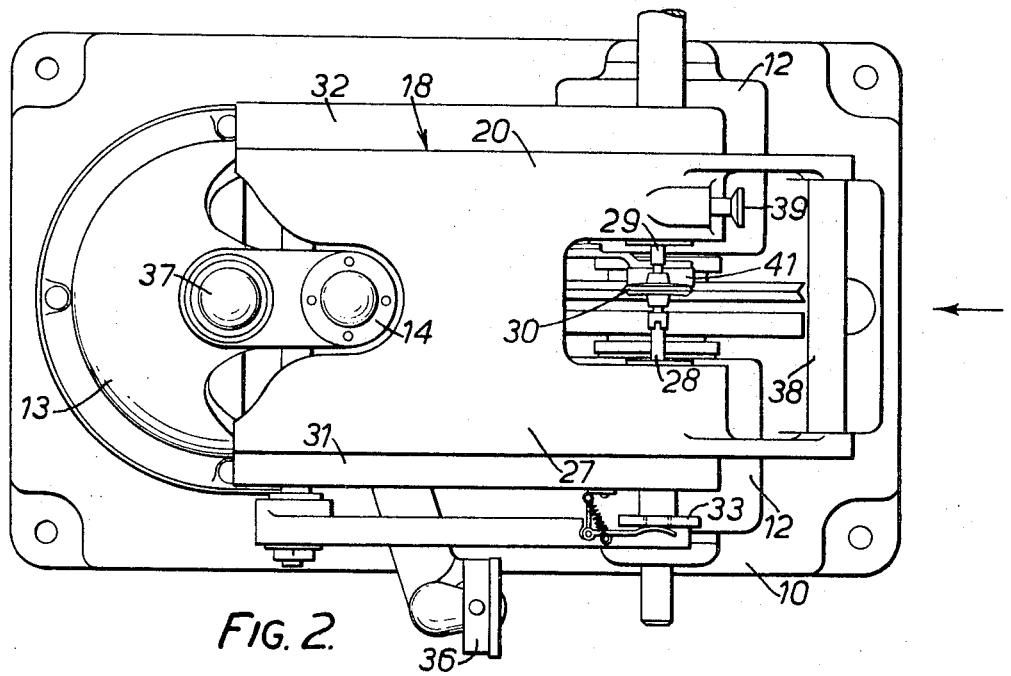
FIG. 2 is a plan view.
Figure 3:
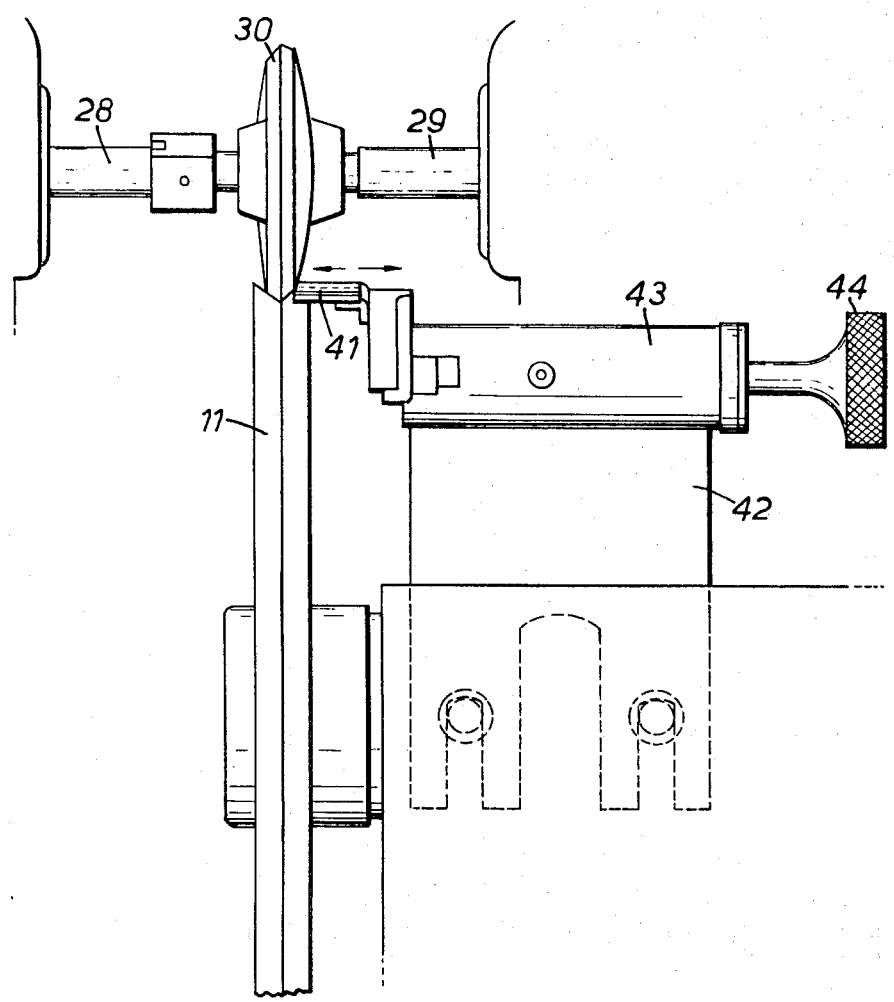
FIG. 3 is a detail view taken in the direction of the arrow in FIGS. 1 and 2.

The stop 41, in the form of an accurate shoe, is mounted bounding but clear of a segment of the grinding wheel 11. The stop 41 is mounted on an upright support 42 which is itself adjustably fixed to the base plate 10. The carrier assembly 18 is biased by a light spring (not visible in the drawings) so that it is urged in the anticlockwise direction (FIG. 2) about the pivot shaft 15 so as to press the lens 30 lightly against the stop 41. Referring to FIG. 3, the stop 41 can be adjusted to the left or right relative to the support 42 by means of a screw mechanism 43 actuatable by a knurled knob 44. Thus the stop 41 can be adjustably positioned with respect to the grinding wheel in order that lenses of various optical characteristics can be edged.

The machine as illustrated includes various refinements such as a dial gauge 36 to facilitate the initial setting up of the machine, an indicator light 37 to indicate when the machine is switched on, a lifting handle 38 for the outer section 20 of the carrier assembly for raising the lens 30 clear of the grinding wheel, and a catch 39 for holding the outer section in its raised position.

What I claim as my invention and desire to secure by Letters Patent is:

1. A process for shaping the edge of a lens made of a transparent plastic material to a desired profile configuration with a V-shaped edge formation, the process comprising: grinding the lens to the desired profile configuration and grinding the edge formation of the lens in a single grinding operation, the grinding operation including rotating the lens about its axis, rotating a grooved grinding wheel, engaging the edge of the rotating lens with the groove in the rotating grinding wheel, guiding the engagement of the lens with the grinding wheel by utilizing a guide template having the same shape as the desired profile configuration and being mounted for rotation coaxially with the lens and in cooperation with a first stop, and centrally locating the lens relative to the grooved grinding wheel during the grinding operation by holding a surface of the lens in contact with a second stop.

2. A process for shaping the edge of the lens made of a transparent plastic material to a desired configuration with a V-shaped edge formation, the process comprising: providing a lens carrier assembly having a rotatable lens support; mounting a guide template within the lens carrier assembly, the guide template having a shape corresponding to the desired profile configuration and being coaxially rotatable with the lens support; providing a rotatable grinding wheel with a V-shaped groove in its peripheral grinding surface; aligning the axis of rotation of the lens support and the axis of rotation of the grinding wheel so as to be substantially parallel with respect to one another; determining the minimum spacing between the axis of the lens support and the axis of the grinding wheel by the contact of the guide template with a first stop member; pivotally arranging the lens guide assembly so as to permit lateral movement of the lens with respect to the peripheral grinding surface of the grinding wheel and to permit relative movement of the axis of rotation of the lens support towards the axis of rotation of the grinding wheel to an extent determined by the guide template and the first stop member; biasing the lens carrier assembly in one direction of the lateral movement; disposing a second stop member for engagement with the lens for limiting the lateral movement of the lens in the one direction for centralizing the lens relative to the groove in the grinding wheel; effecting rotation of the grinding wheel; effecting rotation of the lens support with the lens and the template about its respective axis; presenting the edge of the lens in grinding contact with the grinding wheel; and continuing rotation of the lens and the grinding wheel and the grinding contact between the lens and the grinding wheel until the lens has been ground to the desired profile configuration with a V-shaped edge formation in a single grinding operation.

3. A process as defined in claim 2, further comprising: adjustably mounting the second stop and positioning the second stop for centrally locating the lens relative to the groove in the grinding wheel prior to presenting the edge of the lens into grinding contact with the grinding wheel.

* * * * *